United States Patent [19]

Someya

[11] Patent Number: 5,084,337

[45] Date of Patent: * Jan. 28, 1992

[54] PACKAGING SHEET FOR PERISHABLE GOODS

[75] Inventor: Nobuo Someya, Tokyo, Japan

[73] Assignee: Nissho & Co., Ltd., Tokyo, Japan

[*] Notice: The portion of the term of this patent subsequent to May 28, 2007 has been disclaimed.

[21] Appl. No.: 192,310

[22] Filed: May 10, 1988

[30] Foreign Application Priority Data

May 13, 1987 [JP] Japan .................................. 62-116459

[51] Int. Cl.⁵ ........................ B32B 5/16; B32B 27/32; B65D 65/38
[52] U.S. Cl. ..................................... 428/323; 426/118; 426/415; 428/330; 428/500; 428/521
[58] Field of Search ............... 428/323, 330, 500, 521; 426/118, 395, 396, 415

[56] References Cited

U.S. PATENT DOCUMENTS

| | | | |
|---|---|---|---|
| 3,994,115 | 11/1976 | Mako et al. | 426/396 X |
| 4,056,639 | 11/1977 | Schwarz | 426/264 |
| 4,265,960 | 5/1981 | Arbit et al. | 428/220 |
| 4,847,145 | 7/1989 | Matsui | 428/323 |

FOREIGN PATENT DOCUMENTS 55-70340  8/1980  Japan .

*Primary Examiner*—George F. Lesmes
*Assistant Examiner*—Christopher Brown
*Attorney, Agent, or Firm*—Wegner, Cantor, Mueller & Player

[57] ABSTRACT

The present invention relates to a packaging sheet for perishable goods which is mixed with coral sand. The packaging sheet with coral sand exhibits an excellent freshness-keeping effect for perishable goods when such goods are packaged in the sheet, due to the functions of the coral sand contained in the sheet.

4 Claims, No Drawings

PACKAGING SHEET FOR PERISHABLE GOODS

BACKGROUND OF THE INVENTION

1. Field of the Invention

The present invention relates to a packaging sheet for perishable goods and more specifically to a packaging sheet which has a capability of maintaining the freshness of perishable goods.

2. Prior Art Description

A variety of methods have been employed for keeping perishable goods in a preferable condition in terms of their freshness etc. during transportation or storage. In a typical method, based on the recognition that fresh vegetables release additional-maturation hormones such as ethylene and removal of such hormones gives a prolonged freshness to the vegetables stored such as in a refrigerator, materials with a high adsorptivity to such hormones are used. For example, activated carbon particles or a sheet formed thereform are disposed in a bag in which fresh food is contained so that additional-maturation substances can be removed from the inside of the bag. Another example is show, for instance, in Japanese Patent Public Disclosure No. 61-93835 wherein porous materials having fine pores are subjected to an oxidation process to thereby become adsorptive materials with an adsorptivity to molecules of low number and oxidation-catalytic action.

The known adsorptive materials, however, cannot be expected to have a sufficient freshness-keeping ability and are expensive to manufacture, so they are not always satisfactory in practice. In addition, there is a need to apply conventional adsorptive materials with some additional process so that they are provided with some other functions such as a sterilizing effect as well as adsorptivity as disclosed in the above publication. This also increases the manufacturing cost of the adsorptive materials and as such goes against the demand for decreased manufacturing cost of these adsorptive materials.

SUMMARY OF THE INVENTION

It is therefore an object of the present invention to provide a novel sheet which has an excellent freshness-keeping capability for perishable goods and can be produced at a low cost.

In order to accomplish the above object, the present invention is based on the recognition that coral sands are porous particles and exhibit excellent properties such as a bacterial-growth suppressing function. According to the present invention, coral sand is utilized and mixed into a packaging sheet material for perishable goods, so that the sheet can be provided with excellent freshness-keeping properties. At the same time, the sheet can be provided with, for example, a bacterial-growth suppressing function.

Coral sand is prepared by crushing coral to about 20 to about 80 mesh. Microscopic observation indicates that coral sand particles posess a large number of pores of a diameter ranging from about 10 to 50 micrometer. Owing to these pores, coral sand particles have an extremely large surface area.

Coral is a hard, stony substance formed from the massed skeletons of minute marine organisms called polyps and contains calcium carbonate as a main ingredient, calcium phosphate as a second ingredient, and, as trace constituents, potassium, magnesium, iron, sodium, strontium, and the like.

Functions possesed by coral sand which relates to the perishable goods freshness-keeping property are as follows.

(a) Function of calcium carbonate as a main ingredient

Taking as an example hydrogen sulfide released from fresh broccoli, the following chemical reaction results:

$$2H_2S + 3O_2 \rightarrow 2SO_3 + H_2O + HCHO$$

$$SO_3 + CO_3 \: CO_3 \rightarrow C_3 \: SO_4 + CO_3$$

The resulting carbonic acid gas serves to suppress maturation of the fresh broccoli.

(b) Function of the porous structure of coral sand

As mentioned above, coral sand particles have fine pores with a diameter which have an absorptivity to gaseous materials. These fine pores serve to absorb gas released from fresh goods and dissolve the gas.

(c) pH adjustment function of calcium carbonate in the coral sand:

Calcium carbonate serves to change the atmosphere of the place where fresh goods are stored and the pH thereof from the acid to the alkaline. This suppresses oxidation of the fresh goods and maintains their freshness.

(d) Function of minerals contained in the coral sand:

The coral sand contains various minerals which serve to maintain the freshness of fresh goods.

According to the present invention, natural coral sand is mixed with the row materials for making packaging bags for perishable goods to provide the packaging bags with good freshness-keeping and sterilizing properties and the like. Therefore, according to the present invention, a packaging bag for perishable goods exhibits excellent freshness-keeping ability and can be obtained at a low price.

DETAILED DESCRIPTION OF THE PREFERRED EMBODIMENT

Coral sand was mixed in with the raw materials to form a polyethylene sheet. Then, a packaging bag was made from the sheet for perishable goods. This bag was examined for its freshness-keeping property. The result was that the freshness-keeping ability of the bag was superior to that of conventional freshness-keeping materials. The grain size of the coral sand is preferably in the range of about 100 to about 2000 mesh, and more preferably in the range of about 150 to about 500 mesh.

When a packaging bag is formed of paper or cardboard, it is preferred that the coral sand in sand-form be mixed into the raw material of such packaging bags to thereby obtain a good result in terms of freshness-keeping ability and the like.

I claim:

1. A packing material for perishable goods comprising a sheet formed of a synthetic resin film or a fibrous material and containing therein an agent for improving the freshness-keeping ability of the sheet for perishable goods, the agent for improving the freshness-keeping ability comprising coral sand.

2. The packaging sheet as set forth in claim 1, wherein said sheet is a polyethylene film.

3. The packaging sheet as set forth in claim 2, wherein a grain size of said coral sand is in the range of about 100 to about 2000 mesh.

4. The packaging sheet as set forth in claim 2, wherein a grain size of said coral sands is in the range of about 150 to about 500 mesh.

* * * * *